United States Patent
Qin et al.

(10) Patent No.: US 9,558,055 B2
(45) Date of Patent: Jan. 31, 2017

(54) SYSTEM LEVEL MEMORY LEAK DETECTION

(71) Applicant: Cisco Technology, Inc., San Jose, CA (US)

(72) Inventors: Xianlong Qin, Shanghai (CN); Sivakumar Ganapathy, Santa Clara, CA (US); Fei Xu, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 14/184,150

(22) Filed: Feb. 19, 2014

(65) Prior Publication Data

US 2015/0234700 A1    Aug. 20, 2015

(51) Int. Cl.
*G06F 11/00*     (2006.01)
*G06F 11/07*     (2006.01)
*G06F 11/36*     (2006.01)
*G06F 9/50*      (2006.01)
*G06F 12/02*     (2006.01)

(52) U.S. Cl.
CPC .............. *G06F 11/0778* (2013.01); *G06F 9/50* (2013.01); *G06F 11/366* (2013.01); *G06F 11/3688* (2013.01); *G06F 12/0253* (2013.01)

(58) Field of Classification Search
USPC .......................................................... 714/42
See application file for complete search history.

(56) References Cited

U.S. PATENT DOCUMENTS

| | | | |
|---|---|---|---|
| 7,100,003 B2 | 8/2006 | Betancourt et al. | |
| 7,293,142 B1 | 11/2007 | Xu et al. | |
| 7,487,321 B2 | 2/2009 | Muthiah et al. | |
| 7,653,672 B2 | 1/2010 | Doi et al. | |
| 7,870,358 B2 | 1/2011 | Yang | |
| 7,930,491 B1 | 4/2011 | Xu et al. | |
| 2005/0204342 A1* | 9/2005 | Broussard | G06F 11/0718 717/124 |
| 2006/0085156 A1* | 4/2006 | Kolawa | G06F 12/0253 702/119 |
| 2009/0210750 A1* | 8/2009 | Cates | G06F 11/366 714/42 |
| 2013/0054923 A1* | 2/2013 | Bradley | G06F 11/3636 711/170 |
| 2015/0178127 A1* | 6/2015 | Karunamoorthy | G06F 9/4856 718/1 |

\* cited by examiner

*Primary Examiner* — Amine Riad
(74) *Attorney, Agent, or Firm* — Edell, Shapiro & Finnan, LLC (57) ABSTRACT

A method for detecting memory leaks with an administrative client begins by transmitting to all of the processes running on at least one computing device, a first command to return memory track information. The administrative client receives memory track information from each of the processes, and combines them into a first system wide memory allocation. The administrative client transmits an instruction to run a test case process, and then transmits, to each of the processes, a second command to return memory track information. The administrative client receives the second set of memory track information and combines it to generate a second system wide memory allocation. To generate a list of potential memory leaks originating from the test case process, the administrative client compares the first system wide memory allocation with the second system wide memory allocation.

20 Claims, 6 Drawing Sheets

SYSTEM LEVEL MEMORY LEAK DETECTION

TECHNICAL FIELD

The present disclosure relates to memory leak detection in multi-process environments.

BACKGROUND

Memory leaks are caused by processes with source code which allocates a memory segment, but fails to de-allocate the memory segment after use. This leaves the memory segment unavailable to be accessed by the running code and reduces the amount of memory that can be used in the system. If memory leaks continue being produced without being detected, eventually the process may run out of memory and crash the system. In embedded systems, processes typically communicate with each other. Due to this intercommunication, an operation in one process may lead to a memory leak in another process.

DESCRIPTION OF EXAMPLE EMBODIMENTS

Overview

An administrative client begins a method for detecting memory leaks by transmitting, to a plurality of processes running on at least one computing device, a first command to return an indication of a memory allocation by each of the plurality of processes. The administrative client receives a first plurality of indications of memory allocations corresponding to the plurality of processes, and combines them into a first system wide memory allocation. The administrative client then transmits an instruction to run a test case process on the at least one computing device, and then transmits, to the plurality of processes, a second command to return an indication of a memory allocation. The administrative client receives the second plurality of indications of memory allocation corresponding to the plurality of processes and combining them to generate a second system wide memory allocation. To generate a list of potential memory leaks originating from the test case process, the administrative client compares the first system wide memory allocation with the second system wide memory allocation.

Example Embodiments

The following description is directed to techniques for detecting memory leaks on a system wide basis. The approach described herein provides the capability to detect memory leaks for all of the processes in a system. This may help software engineers capture all of the memory leaks, particularly in examples where one test case process leads to memory leaks in other processes. One example described herein involves detecting memory leaks in processes running on network line cards, but any system with multiple processes running across multiple devices may benefit from the consolidated memory leak detection as described herein.

Figure 1:
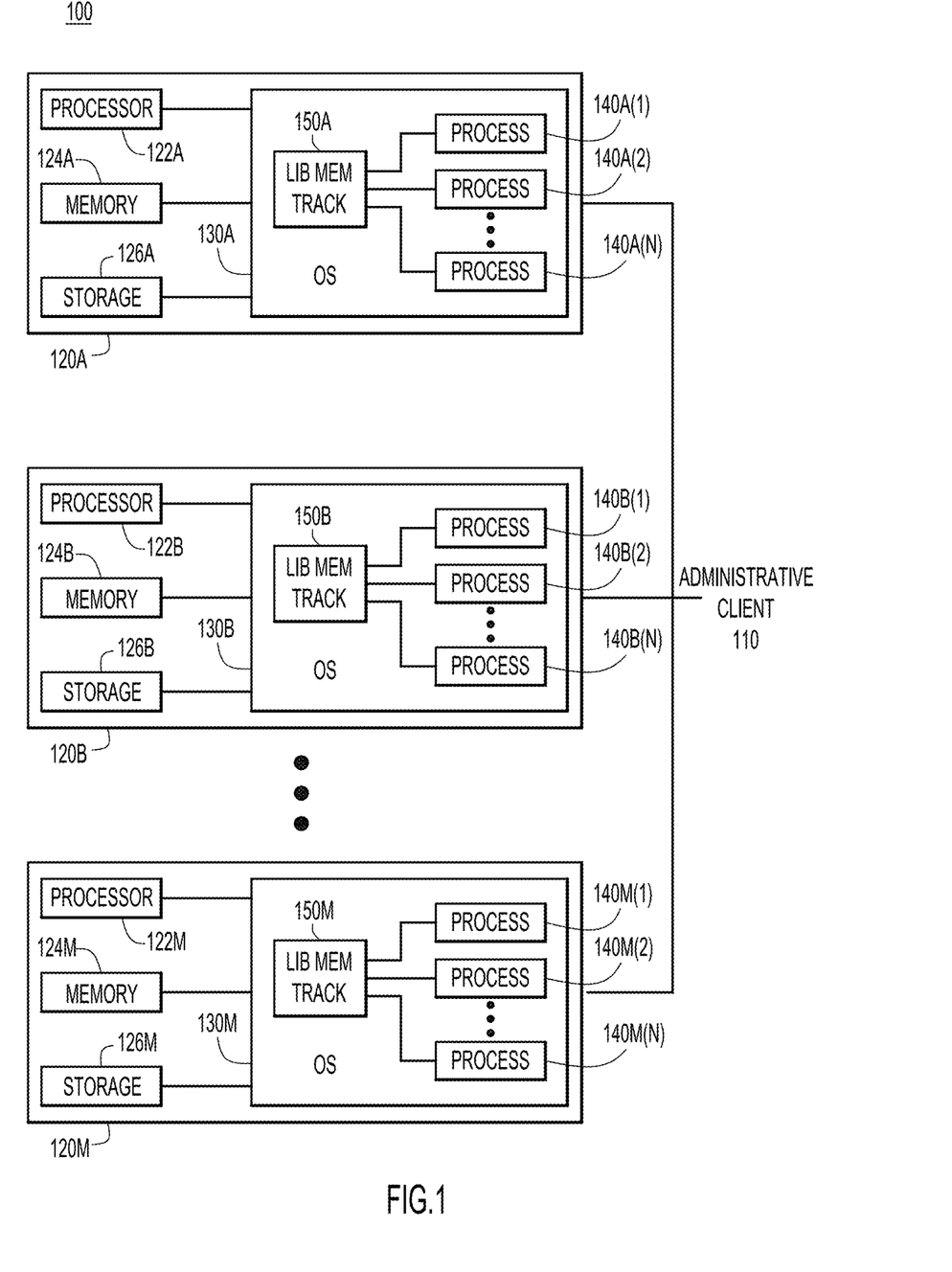
FIG. 1 is a block diagram of an example of a system of for detecting memory leaks in a plurality of network line cards according to techniques presented herein.

Referring to FIG. 1, a memory leak detection system 100 comprises an administrative client 110 and a plurality of M computing devices 120A, 120B, through 120M. In one example the computing devices 120A through 120M may be network line cards. Line card 120A comprises processor 122A, working memory 124A, and storage memory 126A. Similarly, line card 120B comprises processor 122B, working memory 124B, and storage memory 126B. Further, line card 120M comprises processor 122M, working memory 124M, and storage memory 126M. Operating System (OS) 130A is run by processor 122A on line card 120A. OS 130A comprises a plurality of N processes 140A(1), 140A(2), through 140A(N). Each of the processes 140A calls a library 150A for memory tracking according to techniques described hereinafter. Similarly, OS 130B and OS 130M are run by processors 122B and 122M on line cards 120B and 120M. Processes 140B(1), 140B(2), through 140B(N) and 140M(1), 140M(2), through 140M(N) run on OS 130B and 130M, respectively.

In one example, devices 120A through 120M may be identical line cards, as depicted in FIG. 1. Alternatively, devices 120A through 120M may include varying types of computing devices including line cards, embedded systems, servers, desktop computers, laptop computers, mobile/cellular phones, tablet computers, etc. The connection between administrative client 110 and devices 120A through 120M may be any type of network (e.g., any combination of Internet, intranet, local area network (LAN), wide area network (WAN), wired network, wireless network, etc.) that connects computing devices. In another example, client 110 may be connected directly to one or more of devices 120A through 120M. The administrative client 110 may be, in one form, a virtual machine process running in a data center.

Figure 2:
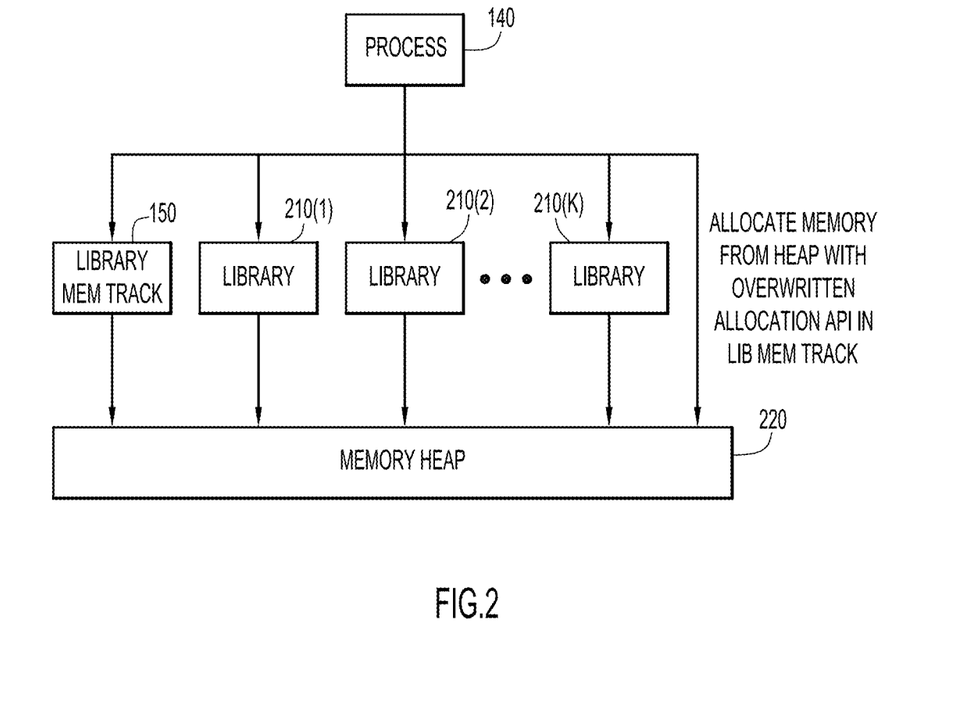
FIG. 2 is a flow diagram depicting a process that tracks memory allocations according to techniques presented herein.

Referring now to FIG. 2, an example of one process 140 for tracking memory allocations is shown. Process 140 invokes multiple libraries 210(1), 210(2), through 210(K), as well as the library 150 for memory tracking. Each library is allocated a memory segment in memory heap 220 of process 140. In one example, library 150 overwrites the typical memory allocation and de-allocation function to invoke the original allocation and de-allocation Application Programming Interfaces (APIs) as well as track the size of allocated and de-allocated memory. The new memory allocation API tracks the memory allocations with an additional parameter, which is a user defined tag. In one example the user defined tag specifies a memory type that may be associated with a specific part of the source code of a process. The new API library (e.g., library 150) overrides the original memory allocation and de-allocation functions.

Figure 3:
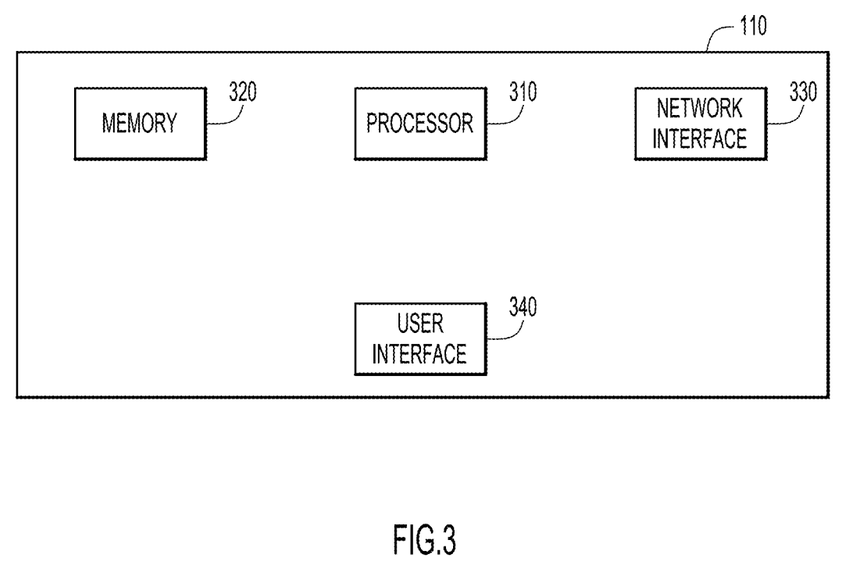
FIG. 3 is an example of a block diagram of an administrative client configured to detect memory leaks according to techniques presented herein.

Referring now to FIG. 3, a simplified block diagram of administrative client 110 is shown. Client 110 includes a processor 310 to process instructions relevant to detecting memory leaks in the system 100, memory 320 to store a variety of data and software instructions (e.g., instructions sent to processes in other computing devices, dumped sets of memory allocations from other computing devices, etc.). The administrative client device also includes a network interface unit (e.g., card) 330 to communicate with other devices. The administrative client device may also include a user interface unit(s) 340 in the form of a keyboard, mouse and/or a touchscreen user interface to allow for a user to interface with the client device. Memory 320 may comprise read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (by the processor 310) it is operable to perform the operations described herein.

Figure 4:
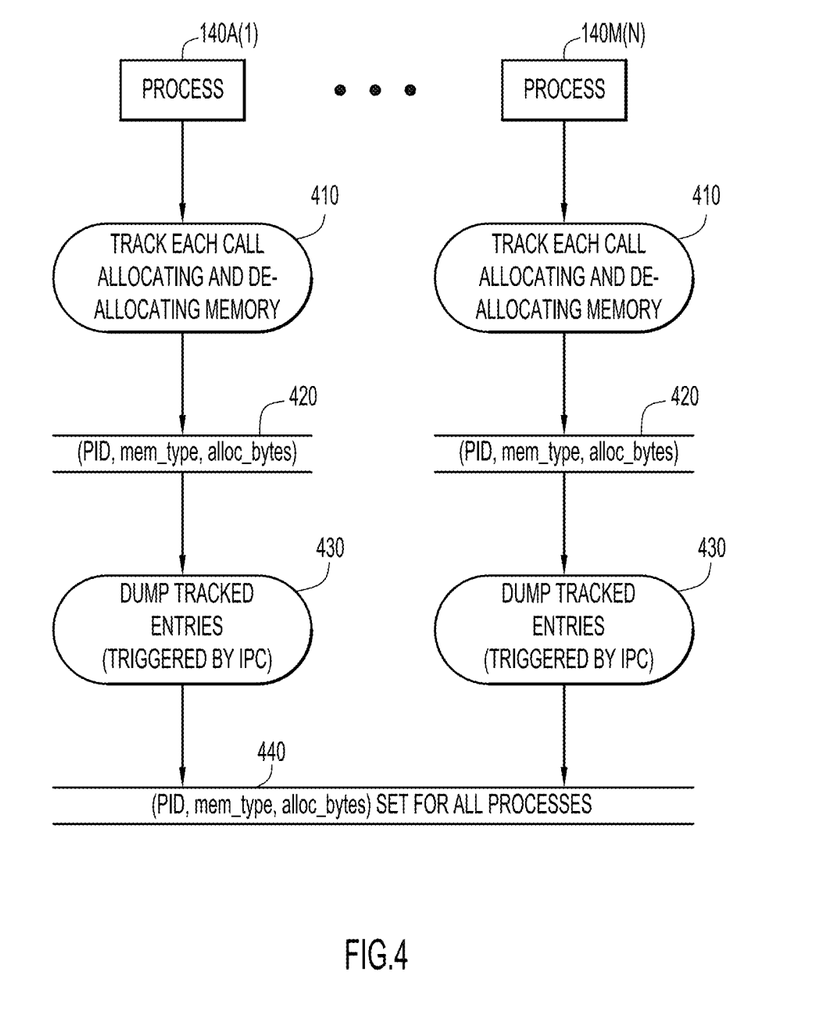
FIG. 4 is a flow diagram of multiple processes, each tracking memory allocations and dumping the saved data to the administrative client according to techniques presented herein.

Referring now to FIG. 4, a diagram of the memory tracking data collected by each process is shown. All of the processes 140A(1) through 140M(N) track each memory allocation and de-allocation call at step 410. Tracking the memory calls results in an indication 420 of the memory allocation for each process 140. The indication of memory allocations 420 are dumped back to the administrative client 110 at step 430. All of the individual indications 420 are collected into a set 440 of the memory allocations that describe the memory allocation of all of the devices 120A through 120M. In one example, the new library 150 provides the API to dump the memory indications 420 for a specific process 140 to a file. The memory indications 420 may include entries in a data structure that describe a process identifier (process ID), the user-defined memory type, and the number of allocated bytes of memory. Each process 140A(1) through 140M(N) listens for and/or detects a predetermined Inter-Process Communication (IPC) message that serves as a trigger to dump the memory indications 420.

In another example, an indication 420 is created for each allocation of memory and that indication 420 is erased when the corresponding segment of memory is de-allocated. In a further example, a debugger may use the memory type entry from the list of potential memory leaks to pinpoint specific portions of source code that may have caused the memory leak.

Figure 5:
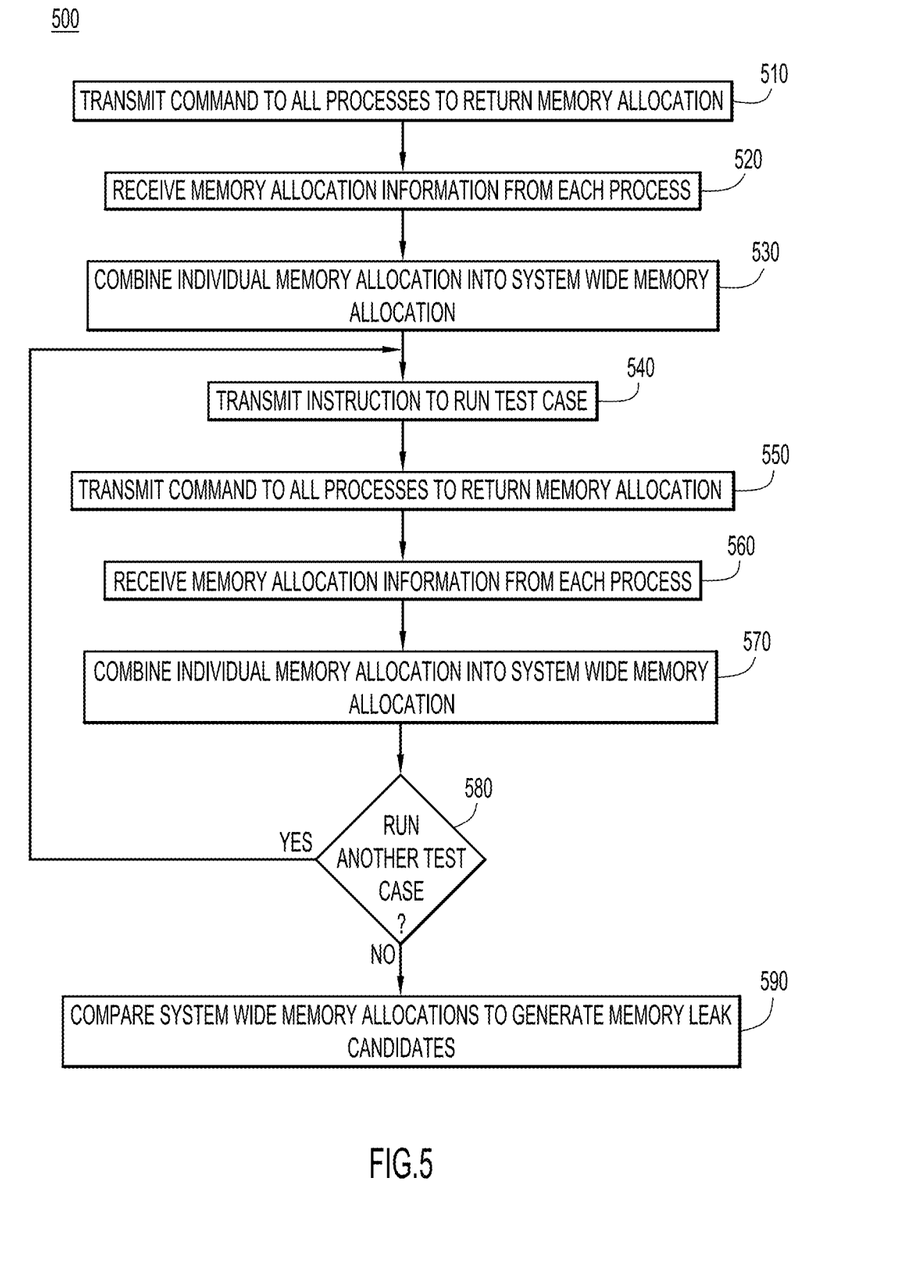
FIG. 5 is a flowchart of an example process for detecting memory leaks according to techniques presented herein.

Referring now to FIG. 5, operations for one example of a process 500 to detect memory leaks is shown. In step 510, an administrative client transmits a command (e.g., an IPC message) to all of the processes in all of the devices. The command instructs each process to dump its tracked memory allocation information. The administrative client receives the dumped memory allocation information from each of the processes in the entire system at step 520. In step 530, the administrative client collects the individual memory track information from each process into a first system wide memory allocation that may serve as a benchmark memory allocation for any further test cases to be executed. In one example, the system wide memory allocation comprises a directory including all of the files dumped from each of the processes in the system.

In step 540, the administrative client transmits an instruction to run a test case process to determine if the test case process causes any memory leaks. After running the test case, at step 550, the administrative client again transmits, to all of the processes, the command to dump all of the memory allocation information. The administrative client receives a second set of dumped memory allocation information at step 560. The second set of dumped memory allocation information is combined in step 570 to form a second system wide memory allocation. If the test case does not need to be run again, as determined in step 580, then the administrative client compares the first and second system wide memory allocations to generate memory leak candidates.

In one example, the test case may be run again, e.g., to improve the accuracy of the list of memory leak candidates, and the administrative client returns from step 580 to step 540 and transmits the instruction to run the test case again. Users may specify a number of iterations to run the test case process, with the administrative client obtaining a system wide memory allocation between each successive iteration. In another example, the memory indications may be stored and compared as binary data structures. Alternatively, the memory indications may be stored and compared as ASCII data structures.

In some examples, the commands to dump the memory indications from each process may be given from a command line interface, such as "debug process memory usage [iteration <num>]." In this example, the option [iteration <num>] provides a user with the option run a test case process a number <num> times. While running the debug process in one shell, the test case process is run <num> times in a separate shell. After each time the test case is run, the debug process captures the system wide memory allocation. Increasing the number of iterations may provide a more accurate report of memory leaks, at the expense of a longer process in getting the report.

Figure 6:
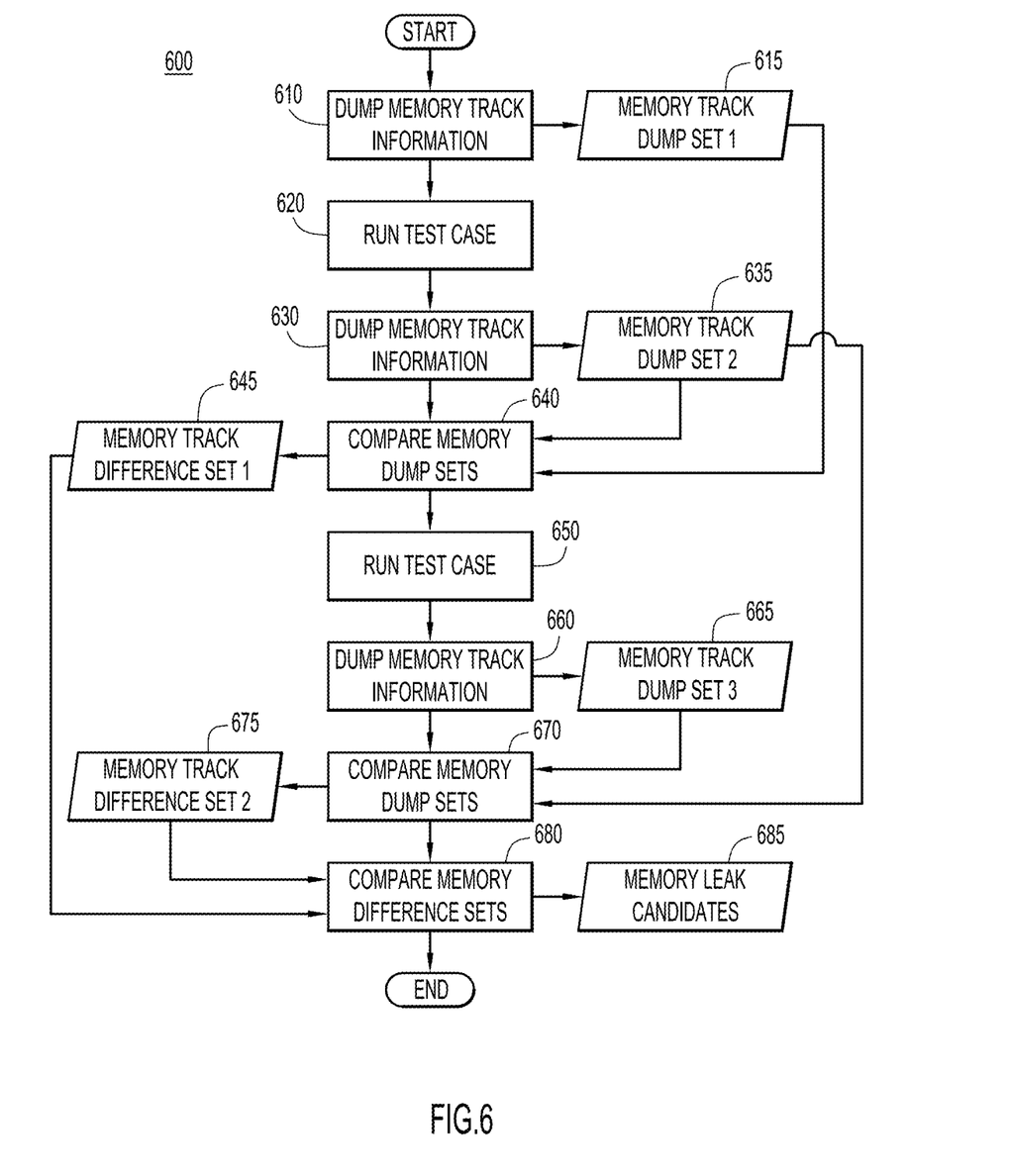
FIG. 6 is a detailed flowchart depicting an example process for detecting memory leaks according to techniques presented herein.

Referring now to FIG. 6, a specific example of a memory leak detection process 600 is shown, including the data results from each process step. After process 600 starts, all of the processes in the system dump their respective memory track information in step 610. This generates a first set 615 of dumped memory track information. After the initial dump of memory track information, the test case is run at step 620. After the test case is run, all of the processes again dump their respective memory track information in step 630. This generates a second set 635 of dumped memory track information. In step 640, the first and second sets of dumped memory track information are compared to generate a first memory track difference set 645. Each entry in the first memory track difference set 645 may be a memory leak.

In order to refine the list of potential memory leaks, the test case may be run again. After the test case is run a second time at step 650, each of the processes in the system dumps their respective memory track information at step 660. This generates a third set 665 of dumped memory track information. At step 670, the second set 635 and third set 665 of dumped memory track information are compared, and a second set 675 of memory track differences is generated. Each entry in the second memory track difference set 675 may also be a memory leak. In step 680, the first memory track difference set 645 and the second memory track difference set 675 are compared, generating a refined set 685 of memory leak candidates. In one example, the two memory track difference sets 645 and 675 are compared by a logical AND operation, and entries that are not present in both sets 645 and 675 are removed from the list of potential memory leaks.

In one example, an entry on the list of potential memory leaks may not be an actual memory leak. One specific example may be found in creating a global link list. In this example, for each execution of the test case, a new node is allocated and added to the global link list. If the node number of the global link list reaches a predetermined maximum number and stops increasing, then this is not a memory leak. However, this memory allocation may be included in the list of potential memory leaks until the test case is run the predetermined number of times and the global link list stops increasing, or until the source code is inspected and it is determined that the memory increase is expected.

In summary, the techniques presented herein allow each process to save its memory usage information (e.g., in the form of data sets of process ID, memory type, allocated bytes). When a user executes the memory leak detection tool, an IPC message is sent to all of the processes in the system, and each of the processes dumps its respective memory usage information. If the user dumps the memory usage information before and after a test case process is executed, then comparison of the memory usage before and after retrieves any increase in memory allocation. The user may run the test again, and get a second set of increased memory allocations. Comparing the two sets of increased memory allocations finds the entries with the same process ID and memory type, and labels these entries as potential memory leaks.

In one example embodiment, a method comprises transmitting to a plurality of processes running on at least one computing device a first command to return an indication of a memory allocation by each of the plurality of processes. Each of the plurality of processes is associated with a process identifier. The method further comprises receiving a first plurality of indications of memory allocation corresponding to the plurality of processes. Combining the first plurality of indications of memory allocation generates a first system wide memory allocation. The method continues with transmitting an instruction to run a test case process on the at least one computing device, and transmitting to the plurality of processes a second command to return an indication of a memory allocation by each of the plurality of processes. After receiving a second plurality of indications of memory allocation corresponding to the plurality of processes, the method comprises combining the second plurality of indications of memory allocation to generate a second system wide memory allocation. The method continues with comparing the first system wide memory allocation to the second system wide memory allocation to generate a list of potential memory leaks originating from the test case process.

In another example embodiment, an administrative client comprises an interface configured to communicate with at least one computing device and a processor. The processor is configured to generate for transmission via the interface to a plurality of processes running on the at least one computing device, a first command to return an indication of a memory allocation by each of the plurality of processes. Each of the plurality of processes is associated with a process identifier. The processor is further configured to receive, through the interface, a first plurality of indications of memory allocation corresponding to the plurality of processes. The processor of the administrative client combines the first plurality of indications of memory allocation to generate a first system wide memory allocation. The processor is further configured to generate for transmission via the interface an instruction to run a test case process on the at least one computing device, and generating for transmission via the interface to the plurality of processes, a second command to return an indication of a memory allocation by each of the plurality of processes. After the processor of the administrative client receives, through the interface, a second plurality of indications of memory allocation corresponding to the plurality of processes, it combines the second plurality of indications of memory allocation to generate a second system wide memory allocation. The processor then compares the first system wide memory allocation to the second system wide memory allocation to generate a list of potential memory leaks originating from the test case process.

In yet another example embodiment, a system comprises a plurality of computing devices and an administrative client. The administrative client is configured to transmit to a plurality of processes running on the plurality of computing devices, a first command to return an indication of a memory allocation by each of the plurality of processes. Each of the plurality of processes is associated with a process identifier. The administrative client is further configured to receive a first plurality of indications of memory allocation corresponding to the plurality of processes, and combines the first plurality of indications of memory allocation to generate a first system wide memory allocation. The administrative client is configured to transmit an instruction to run a test case process on at least one of the plurality of computing devices. After the test case process is run, the administrative client is configured to transmit to the plurality of processes a second command to return an indication of memory allocation by each of the plurality of processes. The administrative client is then configured to receive a second plurality of indications of memory allocation corresponding to the plurality of processes, and combine the second plurality of indications of memory allocation to generate a second system wide memory allocation. The administrative client is further configured to compare the first system wide allocation to the second system wide memory allocation to generate a list of potential memory leaks originating from the test case process.

The above description is intended by way of example only. Various modifications and structural changes may be made therein without departing from the scope of the concepts described herein and within the scope and range of equivalents of the claims.

What is claimed is:

1. A method comprising:
    transmitting to a plurality of processes running on a system comprising a plurality of computing devices connected via at least one network, each of the plurality of processes associated with a process identifier, a first command to return an indication of a memory allocation by each of the plurality of processes;
    receiving a first plurality of indications of memory allocation corresponding to the plurality of processes;
    combining the first plurality of indications of memory allocation to generate a first system wide memory allocation;
    transmitting an instruction to run a test case process on at least one computing device of the plurality of computing devices;
    transmitting to the plurality of processes a second command to return an indication of a memory allocation by each of the plurality of processes;
    receiving a second plurality of indications of memory allocation corresponding to the plurality of processes;
    combining the second plurality of indications of memory allocation to generate a second system wide memory allocation; and
    comparing the first system wide memory allocation to the second system wide memory allocation to generate a list of potential memory leaks originating from the test case process.

2. The method of claim 1, further comprising:
    retransmitting the instruction to run the test case process on the at least one computing device;

transmitting to the plurality of processes a third command to return an indication of a memory allocation by each of the plurality of processes;

receiving a third plurality of indications of memory allocation corresponding to the plurality of processes;

combining the third plurality of indications of memory allocation to generate a third system wide memory allocation;

comparing the second system wide memory allocation to the third system wide memory allocation; and updating the list of potential memory leaks originating from the test case process based on the comparison of the second system wide memory allocation and the third system wide memory allocation.

3. The method of claim 1, wherein each indication of memory allocation comprises the process identifier, a memory type, and a number of memory bytes allocated to the memory type by the process associated with the process identifier.

4. The method of claim 1, wherein generating the list of potential memory leaks comprises selecting every indication of memory allocation in the second system wide memory allocation that does not match any indication of memory allocation in the first system wide memory allocation.

5. The method of claim 4, wherein each indication of memory allocation comprises the process identifier, a memory type, and a number of memory bytes allocated to the memory type by the process associated with the process identifier.

6. The method of claim 5, further comprising producing a debugging output comprising the process identifier and memory type of the selected indications of memory allocation.

7. An apparatus comprising:
an interface configured to communicate with a system comprising a plurality of computing devices connected via at least one network; and
a processor configured to:
generate for transmission via the interface to a plurality of processes running on the plurality of computing devices, each of the plurality of processes associated with a process identifier, a first command to return an indication of a memory allocation by each of the plurality of processes;
receive, through the interface, a first plurality of indications of memory allocation corresponding to the plurality of processes;
combine the first plurality of indications of memory allocation to generate a first system wide memory allocation;
generate for transmission via the interface an instruction to run a test case process on at least one computing device of the plurality of computing devices;
generate for transmission via the interface to the plurality of processes, a second command to return an indication of a memory allocation by each of the plurality of processes;
receive, through the interface, a second plurality of indications of memory allocation corresponding to the plurality of processes;
combine the second plurality of indications of memory allocation to generate a second system wide memory allocation; and
compare the first system wide memory allocation to the second system wide memory allocation to generate a list of potential memory leaks originating from the test case process.

8. The apparatus of claim 7, wherein the processor is further configured to:
cause the instruction to be retransmitted to run the test case process on the at least one computing device;
generate for transmission to the plurality of processes, a third command to return an indication of a memory allocation by each of the plurality of processes;
receive a third plurality of indications of memory allocation corresponding to the plurality of processes;
combine the third plurality of indications of memory allocation to generate a third system wide memory allocation;
compare the second system wide memory allocation to the third system wide memory allocation; and
update the list of potential memory leaks originating from the test case process based on the comparison of the second system wide memory allocation and the third system wide memory allocation.

9. The apparatus of claim 7, wherein each indication of memory allocation comprises the process identifier, a memory type, and a number of memory bytes allocated to the memory type by the process associated with the process identifier.

10. The apparatus of claim 7, wherein the processor is further configured to generate the list of potential memory leaks by selecting every indication of memory allocation in the second system wide memory allocation that does not match any indication of memory allocation in the first system wide memory allocation.

11. The apparatus of claim 10, wherein each indication of memory allocation comprises the process identifier, a memory type, and a number of memory bytes allocated to the memory type by the process associated with the process identifier.

12. The apparatus of claim 11, wherein the processor is further configured to produce a debugging output comprising the process identifier and memory type of the selected indications of memory allocation.

13. A system comprising:
a plurality of computing devices;
a network connecting the plurality of computing devices; and
an administrative client configured to:
transmit to a plurality of processes running on the plurality of computing devices, each of the plurality of processes associated with a process identifier, a first command to return an indication of a memory allocation by each of the plurality of processes;
receive a first plurality of indications of memory allocation corresponding to the plurality of processes;
combine the first plurality of indications of memory allocation to generate a first system wide memory allocation;
transmit an instruction to run a test case process on at least one computing device of the plurality of computing devices;
transmit to the plurality of processes a second command to return an indication of a memory allocation by each of the plurality of processes;
receive a second plurality of indications of memory allocation corresponding to the plurality of processes;

combine the second plurality of indications of memory allocation to generate a second system wide memory allocation; and compare the first system wide memory allocation to the second system wide memory allocation to generate a list of potential memory leaks originating from the test case process.

14. The system of claim 13, wherein the administrative client is further configured to:

retransmit the instruction to run the test case process on the at least one of the plurality of computing devices;

transmit to the plurality of processes a third command to return an indication of a memory allocation by each of the plurality of processes;

receive a third plurality of indications of memory allocation corresponding to the plurality of processes;

combine the third plurality of indications of memory allocation to generate a third system wide memory allocation;

compare the second system wide memory allocation to the third system wide memory allocation; and update the list of potential memory leaks originating from the test case process based on the comparison of the second system wide memory allocation and the third system wide memory allocation.

15. The system of claim 13, wherein each indication of memory allocation comprises the process identifier, a memory type, and a number of memory bytes allocated to the memory type by the process associated with the process identifier.

16. The system of claim 13, wherein the administrative client is configured to generate the list of potential memory leaks by selecting every indication of memory allocation in the second system wide memory allocation that does not match any indication of memory allocation in the first system wide memory allocation.

17. The system of claim 16, wherein each indication of memory allocation comprises the process identifier, a memory type, and a number of memory bytes allocated to the memory type by the process associated with the process identifier.

18. The system of claim 17, wherein the administrative client is further configured to produce a debugging output comprising the process identifier and memory type of the selected indications of memory allocation.

19. The system of claim 13, wherein the plurality of processes running on the plurality of computing device comprises a plurality of embedded systems.

20. The system of claim 19, wherein the plurality of computing devices comprises a plurality of network line cards.

* * * * *